United States Patent [19]

Wilkinson et al.

[11] Patent Number: 4,809,022
[45] Date of Patent: Feb. 28, 1989

[54] DIRECT READ AFTER WRITE OPTICAL STORAGE MEDIUM

[75] Inventors: Richard L. Wilkinson, El Toro; John S. Winslow, Altadena, both of Calif.

[73] Assignee: Optical Disc Corporation, Cerritos, Calif.

[21] Appl. No.: 508,498

[22] Filed: Jun. 27, 1983

[51] Int. Cl.⁴ ............................................. G01D 15/34
[52] U.S. Cl. .............................. 346/135.1; 346/76 L; 430/945
[58] Field of Search .......................... 346/135.1, 76 L; 250/316; 369/283, 284, 288, 275; 430/945; 106/195, 189, 188

[56] References Cited

U.S. PATENT DOCUMENTS

| | | | |
|---|---|---|---|
| 4,101,907 | 7/1978 | Bell | 346/135.1 |
| 4,230,939 | 10/1980 | de Bont | 346/135.1 X |
| 4,330,883 | 5/1982 | Ohta | 346/135.1 X |
| 4,336,545 | 6/1982 | Howe et al. | 346/1.1 |
| 4,340,655 | 7/1982 | Hollister | 346/76 L X |
| 4,345,261 | 8/1982 | Wilkinson | 346/76 L |
| 4,353,767 | 10/1982 | Wilkinson | 156/245 |
| 4,405,994 | 9/1983 | Cornet | 346/135.1 X |
| 4,425,570 | 1/1984 | Bell | 346/135.1 |
| 4,430,401 | 2/1984 | Wilkinson | 346/135.1 X |
| 4,496,957 | 1/1985 | Smith | 346/135.1 |

FOREIGN PATENT DOCUMENTS

| | | |
|---|---|---|
| 0051281 | 5/1982 | European Pat. Off. . |
| 0051283 | 5/1982 | European Pat. Off. . |
| 3142532 | 10/1981 | Fed. Rep. of Germany . |
| 2055218 | 2/1981 | United Kingdom . |

OTHER PUBLICATIONS

Patent Abstracts of Japan, vol. 7 No. 78, Mar. 31, 1983 (Japanese Patent Publ. No. 58-9230).

*Primary Examiner*—Joseph W. Hartary
*Attorney, Agent, or Firm*—Steven P. Brown

[57] ABSTRACT

An optical storage media. The DRAW recording medium of the present invention consists of a three layer structure: a transparent substrate; a uniform layer of a dielectric light-responsive material having a threshold energy level at which a physical change in the material occurs; and a highly electrically conductive and highly reflective overcoating on the opposite side of the light-responsive layer from the substrate. The invention provides a DRAW recording medium which is capable of recording information immediately readable in accordance with the International Electrotechnical Commission optical disc standard for videodiscs.

1 Claim, 3 Drawing Sheets

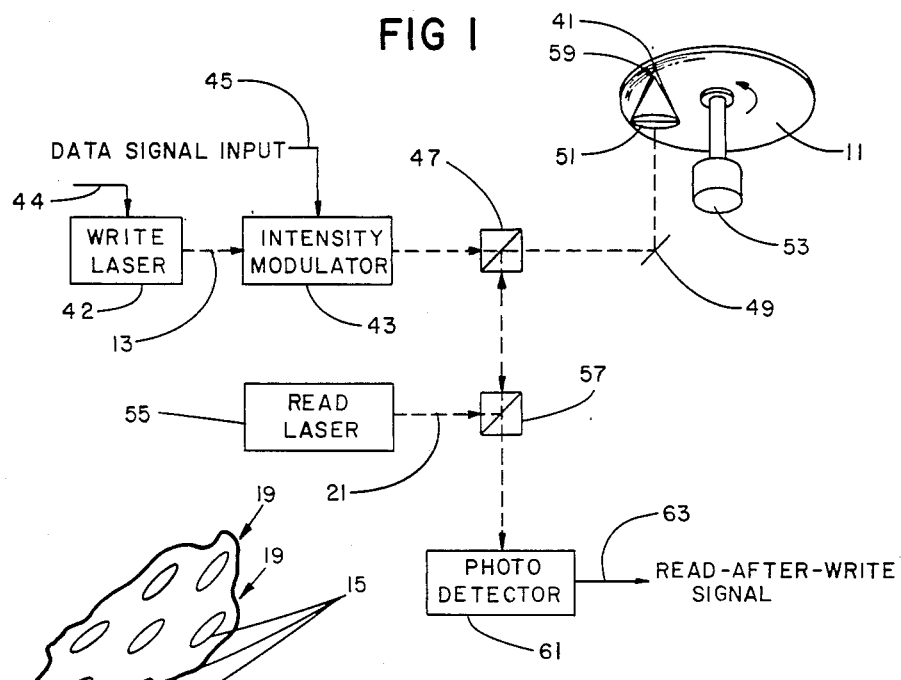
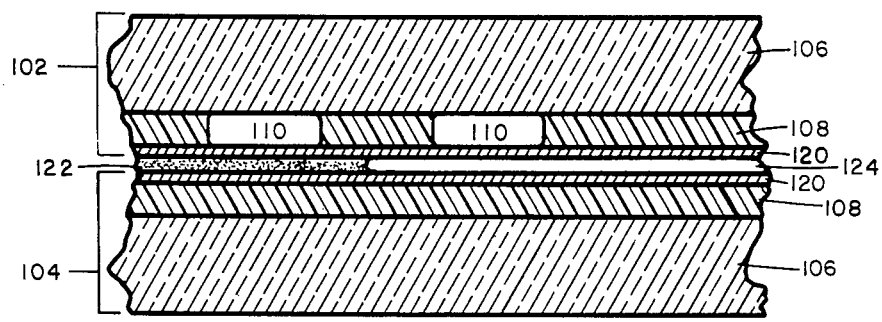

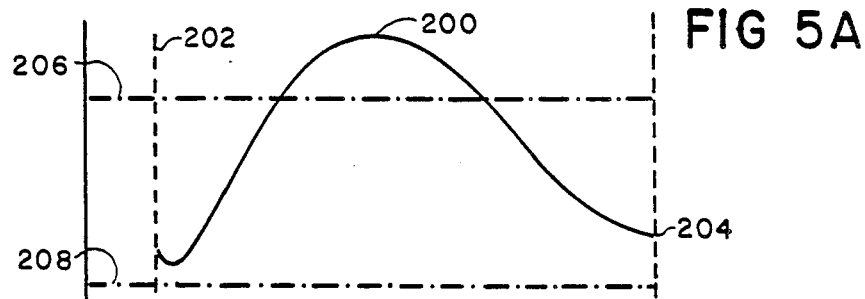
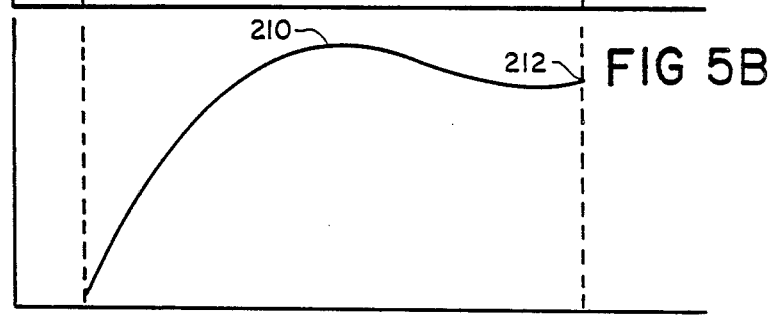
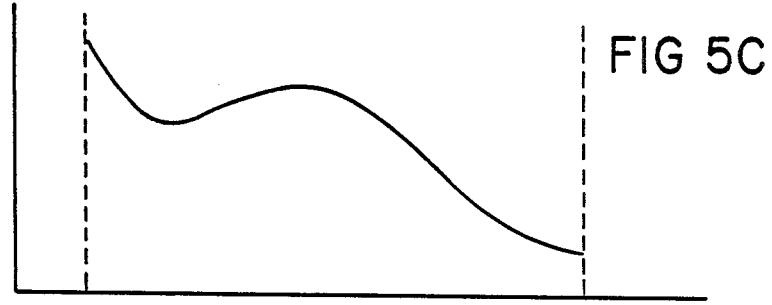
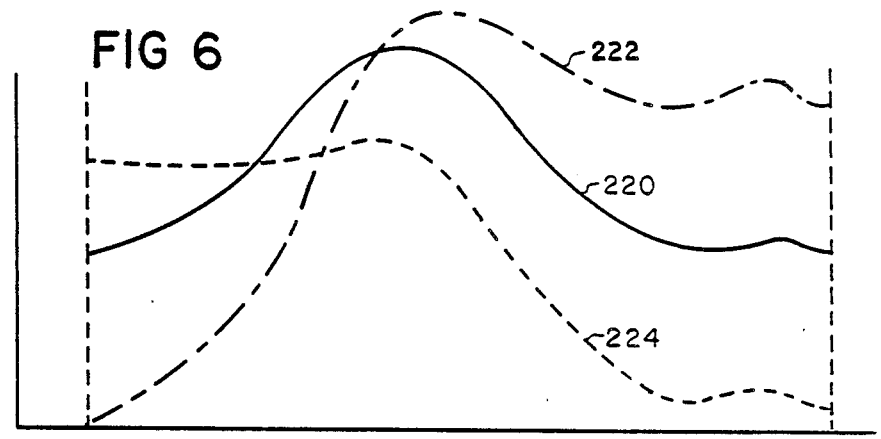

DIRECT READ AFTER WRITE OPTICAL STORAGE MEDIUM

TECHNICAL FIELD

This invention relates to optical storage media and information storage systems for optically recording information in optically readable form. Particularly, the present invention relates to a unique system for achieving optical contrasts in a medium, a unique medium for use with the system, and a unique method for optically forming immediately readable indicia on a storage medium.

DESCRIPTION OF THE PRIOR ART

Many systems and methods are known for optically recording information on moving media. For example, U.S. Pat. No. 4,225,873 describes the recording of video and audio information in a spiral track on a flat disc shaped medium commonly referred to as a videodisc. Similar systems are known for encoding digitalized audio signals on a similar medium known as a digital audio disc. Such systems are commonly used for recording entertainment material for reproduction in the home. Accordingly, such systems are specifically designed to allow for mass replication of the media on a very large scale such as by injection molding.

According to the known processes, the information is caused to modulate the intensity of a laser beam. This modulated beam is directed onto a master disc having a layer of a light sensitive material such as an "AZ" type photoresist. The modulated beam selectively exposes the light sensitive material. The exposed master disc is subsequently developed to remove portions of the light sensitive material to form surface discontinuities on the disc which represent the information. This master disc is subsequently processed to prepare a metallic stamper for use in an injection molding process. The molded replicas are transparent and are subsequently metalized to achieve the reflection required for reproduction of the recorded information on standard videodisc or digital audio disc players using a focussed low intensity beam of laser light. The reflective surface includes surface discontinuities which scatter the reading beam or produce substractive phase interference and modulate the reflected beam.

Due to the relatively high information density and durability of the known optical storage media they are well suited for the storage of many types of information other than entertainment material. For example, one side of a standard videodisc is capable of storing thirty minutes of video information or the amount of digital information contained in ninety standard computer tapes.

Standard videodisc players are relatively inexpensive and can easily be adapted to reproduce digital, video, or compressed audio information.

However, the only methods presently available for producing discs with information which is readable by a standard videodisc player all include the time consuming steps of recording a master matrix, producing a metallic stamper, injection molding replicas, and metalizing the replicas. These processes involve not only considerable time, but also require extremely expensive equipment. The time and equipment costs are tolerable when a large number of replicas are required, but are totally prohibitive for single copy applications.

Other optical recording systems are known for recording single copies of information without the need for producing a metal stamper and injection molding the single copy. The majority of these systems are Direct Read After Write (DRAW) systems which allow the immediate reading of the written information without any intermediate processing. However, prior art DRAW systems have not been capable of producing discs playable on standard videodisc or digital audio disc players.

Standard videodiscs carry video and audio information encoded as an FM signal. This signal is represented on the disc as a spiral track formed of areas of low reflectivity surrounded by a planar background of high reflectivity. The length and spacing of these areas correspond to the periods of individual FM cycles.

In the injection molded discs, the areas of low reflectivity are pits molded in the inner surface of the substrate. After molding, the inner surface is coated with a highly reflective aluminum layer so that the flat background acts like a plane mirror, whereas the pits, seen through the disc, appear to be reflective bumps. The bumps may scatter the incoming reading beam so that only a relatively small percentage of the reading beam is reflected back along the path of the incident light beam, or, alternatively, the top of the bumps may be spaced from the background by a distance choosen to cause subtractive interference between light reflected from the top of the bump and light reflected from the background. The information storage density of the system is determined by the minimum length of the bumps and the minimum spacing between the bumps which can be recognized by the incident light beam. The signal to noise ratio of the reproduced signal is strongly dependent upon the carrier to noise ratio of the signal recovered from the disc, which is in turn dependent upon the difference between the amounts of light reflected back along the incident path by a flat portion of the disc and by a bump.

In order to assure compatibility between players and mass produced videodiscs, a disc standard has been established by the International Electrotechnical Commission (IEC). Among other physical requirements, the IEC standard requires that the disc background be 80%±5% reflective.

Prior art DRAW discs have been incapable of satisfying the IEC standard because of low background reflectivity: they either exhibit bright areas on a dark background or dark areas on a background of intermediate reflectivity. The low background reflectivity of the prior art DRAW discs has required the use of higher powered lasers and higher quality optics than those used in videodisc players.

A representative prior art DRAW medium is disclosed in U.S. Pat. No. 4,305,081. The medium of this patent includes a substrate coated with a reflective layer such as aluminum, which in turn is coated with a thermal recording material. The recording material is absorptive of the wavelength of light used for writing, such that the writing beam causes localized heating of the recording layer. This heating causes the formation of a hole through the recording layer where it is heated above a certain threshold temperature. These craters expose the reflective layer below the absorbing layer and are therefore relatively reflective or bright compared to the background areas where no holes are formed. However, due to the absorptive nature of the background, discs made in accordance with the teaching of this reference are not playable on a standard videodisc player.

It is important to note that the recording efficiency of the medium requires a relatively high absorption of the recording light beam within the layer, whereas the reading efficiency of the medium requires a relatively high transmissivity of the reading light beam through the layer. Most of the variation among different DRAW media relate to various attempts to optimize the writing efficiency without overly sacrificing the reading efficiency.

U.S. Pat. No. 4,176,277 discloses a system in contact with a light-absorptive metal layer by heating the layer with a focussed laser beam. While in theory such a medium provides very high writing efficiency, the reading reflectivity is lower than desired and the debris created while writing tends to reduce writing efficiency by forming light absorbing clouds and depositing a light absorbing film over the objective lens. Furthermore, this debris is scattered over the surface of the disc and makes random variations in the reflected signal which lowers the carrier to noise ratio.

In one embodiment described in this prior patent, the metallic layer is placed over the thermally responsive layer, and portions of the metallic layer are blown away by localized heating of the thermally responsive lower layer. However, the debris problems with such a system are even worse than the debris problems of the previously discussed medium.

Accordingly, a need exists for a DRAW medium and a DRAW recording system with acceptable recording efficiency, high reading reflectivity, and a high carrier to noise ratio of the recovered beam.

SUMMARY OF THE INVENTION

It is therefore an object of the present invention to provide an improved DRAW recording medium and a related DRAW recording system and method which allow for the efficient recording of the information in a form that can be immediately read using relatively low power light sources.

It is a further object of the present invention to provide a DRAW medium which is highly reflective to reading light of a particular wavelength.

It is a still further object of the present invention to provide a DRAW medium and associated DRAW recording system and method in which no debris is generated during the recording process which can occlude the lens or cause noise in the recovered information.

It is another object of the present invention to provide a DRAW medium suitable for use in the form of an optically readable disc playable on a standard videodisc player or digital audio disc player.

It is an associated object of the present invention to provide a DRAW recording medium and associated DRAW recording system and method which are capable of recording information in accordance with the International Electrotechnical Commission optical disc standard for videodiscs.

The present invention satisfies the above objects and overcomes the deficiencies of the prior art by providing a unique DRAW recording medium with increased reading reflectivity and increased reading beam modulation. The unique system and method for recording the information provides relatively high recording efficiency. The recording process is also completely "clean". No debris or condensable by-products are generated during the recording process because the only portion of the recording medium affected during the recording process is an inner layer which is completely sealed from the environment.

In its broadest aspects, the DRAW recording medium of the present invention consists of a three layer structure. The first layer is a transparent substrate. The inner surface of the substrate is coated with a uniform layer of a dielectric light-responsive material having a threshold energy level at which a physical change in the material occurs. The third layer is a highly electrically conductive and highly reflective overcoating on the opposite side of the light-responsive layer from the substrate.

The composition of the substrate is not critical, but it is necessary that it be very transparent to any colors of light used in the writing or reading processes, that it be compatible with the light-responsive layer, and that the substrate and the light-responsive layer have approximately the same index of refraction. Additionally, if optimum information density is desired, it is necessary that at least the inner surface of the substrate be extremely smooth and relatively flat. While the optical properties of glass are well suited for use as the substrate, the physical properties of various plastics make them preferred over glass. Particularly well suited plastics for this purpose are polymethylmethacrylate (PMMA), allyl digycol carbonate, polyethylene terephtalate, polycarbonate, polysulphone, and PVC. Injection molded PMMA is the currently preferred substrate due to increased flatness and optical consistency over other materials. However, any of the above materials and others are suitable if proper care is taken to assure that optical properties such as birefringence are held within acceptable limits.

The light-responsive recording layer must undergo some predictable physical or chemical change at a well determined threshold energy level. It is preferable that the material react only to the writing radiation and that the changed material be at least metastable. The change in the layer can be in the form of a decomposition, a change of state, a change of color, an optical density change, or a change in refractive index. In order to achieve high recording rates, the recording material must respond very rapidly, and the rate of physical change must not be limited by such factors as the diffusion of chemical reactants within the layer. While many such energy responsive materials are available, one preferred class of material is a thermally responsive material which is exothermic and thereby provides a significant portion of the activation energy itself, thereby increasing the writing efficiency of the medium. Some such thermally responsive compositions are discussed in U.S. Pat. No. 4,139,853, the disclosure of which is hereby incorporated by reference.

A mixture of a thermally decomposable material such as nitrocellulose and an appropriate write beam absorbing dye is one preferred composition for the light-responsive layer which is well adapted to forming closely controlled regions of altered refractive index which cause light modulation by phase cancellation. Other polymers are known which thermally react to form optically-dense light-absorbing areas. One such polymer is polyacrylonitrile which decomposes upon heating to form a light-absorbing amorphous carbon.

Dyes having a high absorption include: rhodamines such as Thodamin-B and Rhodamine-6G, xanthenes, for example Pyromine-B and Pyromine-G, acridines, for example Acriflavine, bisphenylmethane dyes, for example, Auramine and Michler's Hydrol Blue, triphenylethane dyes, for example, Malachit Green and Crystal Violet, as well as cyanine chromogenic dyes, for example monomethines, trimethines and pentamethines.

In order to assure uniform recording characteristics, the material in the light-responsive layer must be homogenous and therefore must be kept from crystalizing. Furthermore, the layer must be of extremely uniform thickness and must not react with the substrate or the reflective overcoat. If the substrate is a plastic such as PMMA, the compatibility of the substrate material with the light responsive material and any solvents, dyes, or vehicles with which it is mixed becomes a major concern. The most common method for forming a uniform thin film of material on a substrate is to dissolve the material in an appropriate solvent to achieve a predetermined viscosity, and to deposit the solution on the substrate while the substrate is spinning at a predetermined rate. If the solvent reacts with the substrate in any way, irregularities in the layer will result.

All known prior art organic light-responsive materials or their solvents or binders react with PMMA to form unacceptable irregularities in the deposited layer. Since these organic materials are generally preferred over the inorganic materials, this has greatly limited the use of PMMA for a DRAW medium substrate and often required the use of fragile and heavy glass substrates or intermediate layers.

According to one aspect of the present invention, a mixture of nitrocellulose and a water soluble vat dye of the desired color is dissolved in a solvent consisting of ethylene glycol n-butyl ether with the optional addition of n-butyl alcohol. Extremely uniform layers of light-responsive material have been formed on PMMA using this solution with no observable interaction between the material or solvent and the substrate.

The overcoating material should be as reflective as possible and for reasons which will be discussed below, must be a good electrical conductor. This material should be selected based on the wavelengths of light to be used for the writing and reading of the information. For visible wavelengths, a vapor deposited layer of aluminum in excess of 200 Å in thickness is satisfactory.

In use, the writing beam is directed through the substrate and focussed on the energy responsive layer. Due to the unique recording method and system described below, the writing energy may be concentrated to a well defined volume within the thickness of the energy responsive layer or may be substantially uniformly distributed throughout the layer, depending upon the dimensions of the altered area required by the playback mechanism. The peak intensity of the writing beam is adjusted so that the threshold level of the material within the energy responsive layer is exceeded only where desired within the thickness of the layer, with a minimum of heating of the substrate and the overcoating material, thereby minimizing the energy required to write the information and maximizing the writing efficiency.

The control of the distribution of energy within the layer is accomplished by setting up a standing wave within the energy responsive layer by use of the electrically conductive reflecting layer. Because this reflective layer is highly conductive, the electric field intensity associated with the incoming writing beam of light will, ideally, have a node at the surface of the reflecting layer. The power present at any portion of the dielectric energy responsive layer is then proportional to the square of the sum of the electric fields from the incoming wave and the reflected wave. The amount of energy absorbed by the energy responsive material can be controlled by appropriately choosing the transmissivity of the material to the writing beam. The thickness and transmissivity of the layer may be adjusted to approximately maximize the peak of absorbed energy at a particular position within the layer, or to distribute the absorbed energy so that approximately equal absorption occurs from the inner surface of the substrate to the surface of the reflecting layer. The peak intensity of the recording beam is then adjusted so that the ultimate energy absorbtion within the light responsive layer exceeds the threshold level of the material over the desired depth of the layer. For most applications, it is preferrable to alter substantially the entire thickness of the layer. This provides the maximum margin for intensity fluctuation, and also minimizes the change in volume of the reacting area with fluctuations in recording intensity. For temperature responsive layers, this also allows the beneficial use of the small amount of energy absorbed by the less than perfectly reflective conductive layer.

In accordance with a further aspect of the present invention, it has been found that the shape and positioning of the volume of material which absorbs an amount of energy in excess of the threshold amount can be controlled to optimize the modulation of the read beam which is transmitted through the layer, reflected from the reflective overcoating, and transmitted back through the layer. This is accomplished by adjusting the transmissivity of the light-responsive layer, the thickness of the layer, and the peak intensity of the writing beam relative to the threshold energy level of the material.

If the material undergoes a change in density with a corresponding change in its index of refraction, it is advantageous to adjust the above-mentioned parameters such that the entire thickness of the layer is approximately equally affected. If the thickness of the layer is selected so that the change in index of refraction over that distance causes approximately a one quarter wavelength shift of the reading beam of light relative to the unaffected material, passage of the reading beam through the affected area twice will result in a half wave difference in phase between portions of the reflected beam which passed through the affected areas, and portions which passed through unaffected areas. This will result in phase cancellation of the reading beam if the sizes of the affected areas are properly related to the size of the reading beam. This effect combined with the diffraction effects of the affected area within the light-responsive layer are capable of producing a modulation of the reading beam comparable to that normally produced by the reflecting surface discontinuities of injection molded optical disc replicas.

It should be appreciated that the structural characteristics of the medium of the present invention which contain the written information are completely different from the structural characteristics of all prior art mass-replicated, reflective, optical discs. The replicated prior art reflective discs have relied upon surface reliefs in the reflective layer to either scatter light incident upon the reflective layer or modulate the reflected light due to phase cancellation between portions of the beam reflected from adjacent reflecting surfaces spaced an odd quarter wavelength multiple from one another.

While such surface relief structures have been acceptable for mass produced videodisc replicas, no reliable and efficient means of forming such structural relief in a DRAW medium exists and no previous system of optically forming areas of altered density have allowed the formation of altered areas within a sealed structure and a structure of such high reflectivity.

In accordance with one aspect of the present invention, the light-responsive layer can include a dye which is highly absorptive of a writing beam of light having a relatively short wavelength, and relatively transmissive of light having a wavelength of 6328 Å as produced by a helium-neon gas laser or of a wavelength in the range of 7800 Å to 8500 Å such as produced by a diode laser.

Due to its high absorption of the writing beam, such a medium has an extremely high writing efficiency. Since many thermally responsive materials are available which are essentially transparent to red light, and since the dye is highly transmissive of the red light, the red light from a helium-neon or solid state laser used in a standard videodisc player or digital audio disc player will be transmitted very efficiently by the light-responsive recording layer. Such a structure allows for the production of a DRAW medium which has excellent recording efficiency and which has sufficient red light reflectivity and red light modulation to allow reading of information by a standard optical videodisc player or digital audio disc player. In other words, a DRAW medium can be produced which allows writing with a relatively low powered writing laser such as a 100 milliwatt argon ion laser and which satisfies the specifications of the IEC standard for optical videodiscs.

This unique structure allows for a writing beam absorption of up to 90% while simultaneously allowing a read beam reflectivity in excess of 80%. Clearly, if the same color of light is used for both writing and reading, such efficiencies are not possible and a trade-off exists between writing efficiency and reading efficiency. However, even in such circumstances, the medium of the present invention is superior to prior art mediums in that it is inherently highly efficient. That is, light of a particular wavelength is either absorbed by the light-responsive layer or is reflected back through the substrate. Very little loss occurs in the substrate and the reflective overcoating. Furthermore, increased efficiencies are provided by the present invention by controlling the energy distribution of the writing beam within the depth of the light-sensitive layer, to produce the maximum affect on the reading beam for a particular reading mechanism. Additionally, an essentially continuous gradation of writing efficiency versus reading efficiency is available, so that the writing versus reading efficiency of the medium can be custom tailored to fit any desired single wavelength DRAW system.

Further distinctions and advantages of the present invention will become apparent in connection with the following description of the preferred embodiments of the present invention.

BRIEF DESCRIPTION OF THE DRAWINGS

FIG. 1 is a schematic view of a DRAW recording and reading apparatus for use with the present invention;

FIG. 2 is a close-up perspective view of a portion of a disc in accordance with the invention;

FIG. 3 is a cross sectional view of the disc of FIG. 2; and

FIGS. 4A-D, FIGS. 5A-C, and FIG. 6 are graphs showing energy distributions within the discs during the writing process.

DESCRIPTION OF THE PREFERRED EMBODIMENTS

Figure 4A:
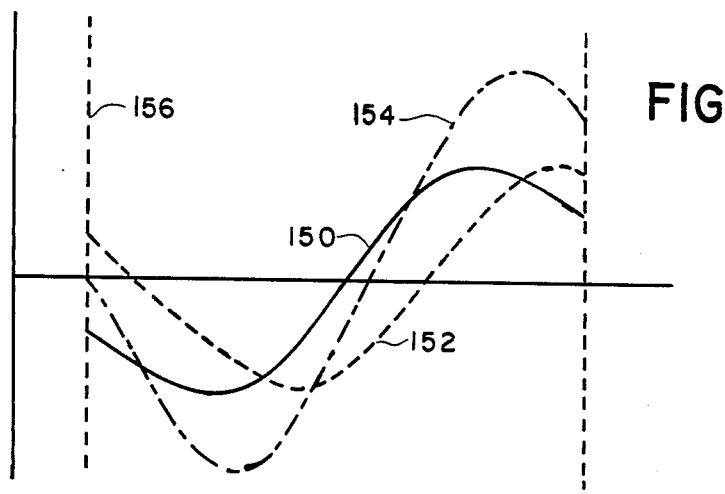

Referring now to the drawings, and particularly to FIG. 1, there is shown a disc recording apparatus for recording a data signal, such as a frequency-modulated video signal or digital signal, on a rotatable recording disc 11. Such an apparatus is known in the art and is similar to the mastering machines used for recording master discs for use in mass production disc replication. The recording apparatus operates to direct a write beam of light 13 onto the disc as the disc is rotated at a prescribed angular velocity, the beam being modulated in intensity according to a data signal to be recorded. This forms a succession of microscopic information-bearing altered areas 15 (FIG. 2), arranged in a plurality of substantially circular recording tracks 19 in a spiral or concentric circle pattern on the disc.

The recording apparatus may further operate to focus onto the disc a read beam of light 21 having a constant intensity, substantially less than the peak intensity of the write beam 13, to scan the successive areas 15 immediately after they are formed by the write beam. This permits a continuous control of both the power level and focus of the write beam, so that the signal can be recorded properly over the entire disc.

The write beam of light 13 is produced by a write laser 42, such as an argon ion or other gas laser, or a diode laser. Accordingly, the wavelength of the write beam could be anywhere from 4500 Å to 8500 Å. The intensity of this beam may be adjusted by the intensity control 43 to set the peak recording intensity. The write beam from the laser is transmitted to an intensity modulator 43, which modulates the intensity of the beam in accordance with the data signal supplied over line 45 from a data subsystem (not shown). The modulator can comprise either a pockels cell or an acoustic modulator. The peak intensity is adjusted using control 43, so that the intensity of the modulated beam is alternately greater than and less than that required to transfer the threshold energy of the light responsive material to the moving material during the writing operation.

The intensity-modulated write beam 13 is transmitted from the modulator 43 through a first beam splitter 47 to a mirror 49, where it is reflected and transmitted to an objective lens 51, which focuses it to the diffraction-limited spot 41 on the disc 11. The disc is rotated at a prescribed angular velocity by a spindle motor 53, and the mirror and the objective lens are mounted on a carriage (not shown) that is movable radially relative to the disc, so that the data signal can be recorded successively in the plurality of substantially circular recording tracks 19 (FIG. 2).

The read beam of light 21, which is utilized in reading the data signal immediately after it has been recorded on the disc, is produced by a read laser 55. The beam has a constant intensity, substantially less than that of the write beam 13. The read laser can advantageously comprise a helium neon laser which produces a beam having a wavelength of approximately 6328 Å, or it could be a diode laser which produces a beam having a wavelength in the range of 7800 Å to 8500 Å. Alternatively, a portion of the writing beam could be used for reading, meaning that the read beam wavelength can also be anywhere from 4500 Å to 8500 Å.

The read beam 21 is initially directed through a second beam splitter 57 to the first beam splitter 47, where it is reflected and combined with the write beam 13. Thereafter, it follows essentially the same path as the write beam until it is focused to a diffraction-limited spot 59 on the disc 11. The two beams are aligned such that their respective points of impingement 41 and 59 on the disc are at the same radius, with the write spot positioned 5 microns (for example) ahead of the read spot so that writing is accomplished slightly before reading.

The read beam of light 21 has a constant intensity that is insufficient to transfer the threshold level of energy to the light responsive layer, so it does not produce any altered areas in the layer. Thus, in the disc of FIG. 2, when the read beam impinges on portions of the disc 11 which have not been altered, it is transmitted through the light-responsive layer and reflected by the underlying reflective layer back to the objective lens 51. When it is focused on an altered area 15, on the other hand, it is absorbed or scattered by the altered area, or its phase relationship is changed so that when it is reflected by the reflective layer, a reduced portion of it is collected by the objective lens. Thus, the reflected beam collected by the objective lens is modulated in intensity by the recorded pattern of altered areas.

The reflected read beam 21 collected by the objective lens 51 is transmitted from the lens via the mirror 49 to the first beam splitter 47, where it is reflected and transmitted to the second beam splitter 57. From there, the reflected beam is transmitted to a photodetector 61, which produces a corresponding read-after-write electrical signal. This signal is supplied over line 63 and may be used by appropriate circuitry (not shown) for continuously controlling both the power level and the focus of the write beam, whereby the data signal can be properly recorded over the entire surface of the disc 11. The recovered signal can also be used for checking the accuracy of the information recorded on the disc.

It will be appreciated that the reading apparatus described above is very similar to standard video disc players or digital audio disc players, and such players operate in the manner described above.

If the altered areas 15 are to be read by substractive interference, the width of the areas should be controlled so that half of a focused spot of the reading beam impinges on the altered area and half impinges on the surrounding unaltered area. For a standard video disc player, this means that the areas 15 should be approximately 0.3 $\mu$m to 0.5 $\mu$m in width.

If the altered areas 15 are to be read by differential reflection or absorption qualities, the areas should be wide enough that a majority of the focused reading beam impinges the area 15 and a minimum of the focused beam impinges the unaltered area. For a standard video disc player, this means that the areas 15 should be approximately 0.6 $\mu$m to 0.7 $\mu$m in width. However, altered areas of this width are sometimes difficult to produce due to the amount of power required and other factors. Although the modulation and signal quality of the recovered signal may be less than with a standard videodisc, a playable disc can be made having red light absorbing areas as small as 0.4 $\mu$m in width.

FIG. 3 is a cross sectional view of a double sided DRAW disc in accordance with the present invention. The upper side 102 has been written on, and the lower side 104 is blank.

Each side of the disc includes a transparent substrate 106. The substrate is preferably transparent to any wavelength of light to be used during the reading or writing processes and is sufficiently thick to provide adequate support to the disc during handling and use. Since both the writing and reading beams of light are focussed on the light responsive layer through the substrate, the substrate thickness must fall within the limits required by the selected objective lens parameters to allow adequate focus of the beams. A nominal thickness for the substrate 106 is 1.25 mm. Two half discs including substrates of this thickness can be glued together as shown in the figure to form a double disc in the range of 2.5 mm to 2.9 mm, in accordance with the IEC standard for optical videodiscs.

Although not shown, the substrate can be formed of a plurality of layers of different transparent materials to achieve desired qualities. For example, a layer of silicon oxide or silicon dioxide could be deposited on the substrate to prevent interaction between the light-responsive coating solution and the substrate.

Layers 108 of light-responsive material are coated on the inner surfaces of the substrates 106. The materials forming these layers and the thicknesses of these layers are discussed in great detail below.

The light-responsive layer 108 of the upper disc half 102 includes a plurality of optically altered areas 110 sized and spaced to represent the recorded information. It is important to note that these areas 110 may selectively be caused to lie completely within the layer 108 and may or may not be contiguous with either surface of the layer 108.

Electrically conductive and light-reflecting overcoating layers 120 are deposited over the inner surfaces of the light-responsive layers 108. The reflective layers 120 may be formed by vapor deposited aluminum in excess of 200 Å in thickness, or any similar metallic substance such as gold, silver, or copper having good reflectivity of the wavelengths of light used in writing and reading, and being sufficiently electrically conductive to form a standing wave in the light-responsive layer.

Also not shown, optical spacers of a transparent material can be formed between the light-responsive layers and the reflective layers.

The two reflective overcoatings 120 are glued together using any convenient adhesive layer 122 which is compatible with the reflective overcoating material. For example, the adhesive may be a water soluble adhesive, a rubber based contact adhesive, or a thermally activated adhesive.

If the adhesive chosen is incompatible with the overcoating material, a protective intermediate layer (not shown) may first be applied to the two reflective overcoating layers prior to application of the adhesive to prevent the attack of the overcoating layers by the adhesive. However, since such layers are often thermally conductive, it is preferrable to apply such overcoating layers and the glue only at the inner and outer boundaries of the discs where no information is recorded. This leaves a thin void 124 between the information carrying areas of the two disc halves.

It should be noted that the information carrying layer of the above-described medium is sealed and protected within the structure of the medium such that once the information has been written on the medium, it is relatively immune to damage or contamination from dust and the like. Similarly, since the physical changes forming the optically altered areas 110 occur within the light-responsive layer 108 any solid or condensible by-products generated by chemical changes or phase changes in those areas are contained within the layer and cannot interfere with the subsequent recording of other areas or with previously recorded areas. If gaseous by-products are generated, the substrate or reflective layer is preferably chosen to have sufficient gas permeability to allow the gasses to escape. Also, the reflective layer is made thick enough to assure that the reflective layer will not be damaged by the writing process.

FIG. 4A is a representative graph showing the instantaneous electric field strength versus distance in a dielectric material adjacent the surface of an electrically conductive reflecting -layer. The line 150 is the plot of the maximum instantaneous electric field strength of an incoming travelling wave. The line 152 is a plot of the instantaneous electric field intensity of the wave reflected from the electrically conductive reflective layer. The line 154 is a plot of the resultant electric field of the standing wave, the sum of the fields represented by the lines 150 and 152. Because the reflective layer is electrically conductive, the electric field strength will be nearly zero at the interface 156 between the electrically conductive layer and the dielectric layer.

Figure 4B:
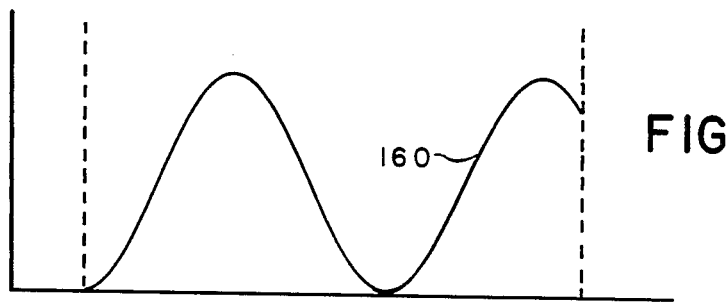

FIG. 4B is a plot 160 of the instantaneous power present within the dielectric material as a result of the incoming and reflected light. The power is proportional to the square of the electric field of the resultant wave (shown as 154 in FIG. 4A). Since the power is proportional to the electric field strength squared, the power always has a positive value.

Figure 4C:
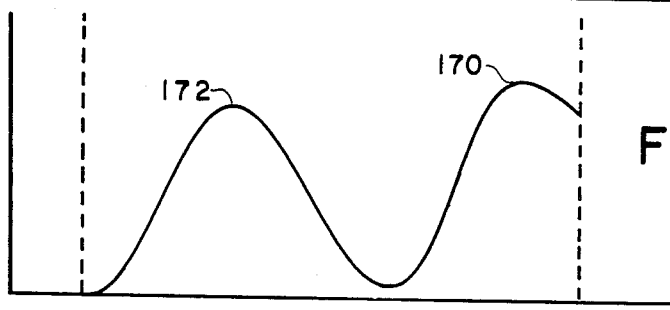

FIG. 4C is a similar plot of electrical power within a dielectric medium, but in this example the dielectric medium is partially absorptive of the light. Accordingly, a portion of the light is transformed to heat and the electrical power decreases with distance from the substrate surface. This is represented by the decreasing energy levels of the first half cycle 170 of the resultant wave and the second half cycle 172 of the resultant wave.

Figure 4D:
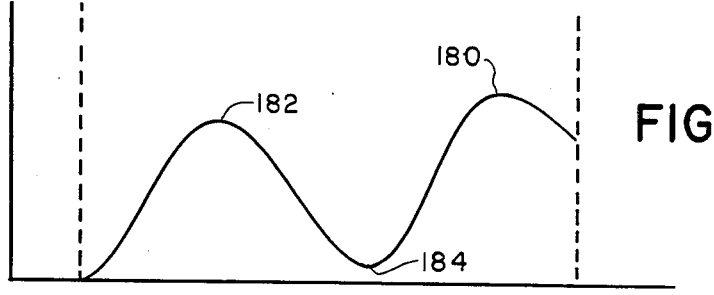

FIG. 4D is a plot of the temperature of the above-discussed light-absorptive dielectric layer as a result of the conversion of the light energy into heat energy. It should be noted that the temperature across the depth of the light absorptive dielectric layer varies in accordance with the electric power, and that by concentrating the electric power by establishing a standing wave within the dielectric material, it is possible to establish isolated areas 180 and 182 of higher temperature separated by an area 184 of lower temperature.

One aspect of the present invention takes advantage of this principal to control the depth and position of optically altered areas within a layer of material having a defined energy threshold. Clearly, if the temperature threshold of the dielectric material is above the temperature represented by the point 184 and below the temperature represented by the point 182, two separated areas within the layer will be altered. The boundaries of these areas will be approximately defined by the constant temperature surface ("isotherm"), the temperature of which is equal to the threshold temperature of the material. By adjusting the wavelength of the writing light beam, the thickness of the light absorbing dieletric layer, and the transmissivity of the layer, different temperature distribution patterns can be established within the layer to produce variously shaped altered areas.

If the peak power points of the standing wave are made to just exceed the threshold levels of the material, relatively thin altered areas will be formed at these peaks. These altered areas will be positioned at one quarter, three quarters, five quarters, etc. wavelength of the writing beam from the reflecting layer.

If the layer includes a material such as polyacrylonitrile which decomposes to form a more absorptive area, a thus altered layer will be strongly absorptive at the writing wavelength and harmonics thereof.

Alternatively, if the layer contains a bleachable dye which is less absorptive in its altered form, the thus altered layer would have a dip in absorptivity at the writing wavelength.

In both cases, the wavelength selectivity of the altered layer will increase with an increasing number of layers of altered areas.

If it is desired to alter all of the layer instead of portions within the layer, a higher absorption coefficient can be used to raise the minimum power points of the standing wave pattern, or a heavier exposure can be used to assure that the threshold level of the material will be exceeded at these minima.

In order to avoid excessive heat-sinking by the reflective layer, the thickness of the layer should be kept to a minimum. Additionally, a wavelength selective reflectiving material such as gold could be used. Because of its relatively low reflectivity of blue light, such a layer would deminish the standing wave amplitude and would be heated by a blue writing beam. However, such a layer would provide good reflectivity of red reading light.

Since the standing wave power is relatively low near the reflective layer, very little energy is transferred to the layer at this point and the light absorbed here (and adjacent other minima of the standing wave) is to some extent wasted.

For at least this innermost minimum, it is possible to prevent some of this waste by substituting a non-absorbing or transparent material for a portion of the light absorbing layer. This is done by forming a light absorbing layer of reduced thickness and subsequently forming an intermediate layer of transparent material. Since the total thickness has not been changed, the reading qualities are essentially uneffected and the maxima of the writing standing wave occur at the same positions within the layer. Due to the decreased absorption, the standing wave effect is greater, and increased writing efficiencies can be obtained if the thickness of the transparent layer is properly chosen to maximize energy coupling to the absorbing layer. A transparent layer approximately one-eighth of a wavelength in thickness will accomplish this.

A suitable transparent layer can conveniently be formed by vapor depositing silicon monoxide or silicon dioxide. Naturally, many other transparent materials could be used, provided they can be evenly deposited over the light absorbing layer and further provided that they are compatible with the reflecting layer.

FIG. 5A is a temperature plot for a single sided DRAW medium in accordance with the present invention. In this example, the wavelength of the writing beam of light in the dielectric light-responsive layer is approximately twice the thickness of the layer. Accordingly, the quarter wavelength point of the standing wave which corresponds to the peak electric field strength is located approximately in the center of the layer and the highest temperature point 200 is also approximately in the center of the layer. Since the electric field strength is at a minimum adjacent the conductive layer, the temperature is also a minimum near the interface 202 between the light-responsive dielectric layer and the electrically conductive reflective layer, except for the small area heated by conduction from the reflective layer. The temperature has some intermediate value 204 at the outer boundary of the light-responsive dielectric layer. This intermediate value is in part determined by the heat-sinking action of the substrate.

The intensity of the writing beam may be adjusted so that the threshold temperature of the light-responsive material falls at a point 206 approximately half way between the temperatures 200 and 204. This results in the best recording signal-to-noise ratio for a partial depth altered area since the threshold temperature is located at the steepest portion of the curve between the points 200 and 204, meaning that the smallest and most linear size variation of the isotherm occurs for a given variation in the intensity of the writing beam. Alternatively, the intensity may be adjusted so that the threshold temperature falls at a point 208, below the points 200 and 204, resulting in the altering of the entire depth of the layer.

FIG. 5B is a plot similar to FIG. 5A, except that the dielectric material represented in FIG. 5B is more highly absorptive of the writing beam than the dielectric material in FIG. 5A. This increase in absorptivity (a decrease in transmissivity) results in more of the energy of the incoming beam being absorbed by the outer portions of the layer, resulting in more heating near the substrate, less heating near the reflective layer, less heating of the reflective layer, and less difference between the peak temperature 210 within the layer and the temperature 12 at the outer boundary of the layer.

If the intensity of the writing beam is adjusted so that the threshold level of the material is below the temperature 212 at the outer extreme of the light responsive layer, it is possible that the altered area will extend all the way to the interface with the substrate, but not all the way to the reflective layer.

As the absorptivity of the dielectric material is increased further, less and less light reaches the reflective layer, and the standing wave effect is decreased. At some point, no energy will reach the reflective layer and no standing wave will be established. In such a case, the medium will resemble prior art DRAW media which have no reflective electrically conductive overcoating layers. Since the energy at a given depth of the layer decreases exponentially, the temperature at the outer surface of the layer will be far greater than the temperatures within the layer. Due to the slight thermal conductivity of the light responsive layer, it is possible in certain circumstances to supply sufficient energy to the outer surface of such a layer to cause the entire thickness of the layer to be heated above the threshold level. This technique was used in many prior art DRAW media. However, such a "brute force" method is wasteful of writing energy, greatly reduces the control over the size and shape of the altered area, and also leads to noise producing distortion or decomposition of the substrate due to the high temperatures of the light responsive layer adjacent the substrate.

FIG. 5C is a plot similar to FIG. 5A, except that the dielectric medium represented in FIG. 5C is less absorptive of the writing beam than the dielectric material of FIG. 5A. This decrease in absorptivity results in more of the energy of the incoming beam reaching the reflective layer, resulting in less heating near the substrate, more heating near the reflective layer, and more heating of the reflective layer.

As the medium is made less and less absorptive of the writing beam, less and less energy is absorbed dirctly by the light responsive material, and more energy is dissipated in heating the reflective layer or is simply reflected back through the dielectric layer and is wasted.

If the medium is to be used in a DRAW system in which the writing wavelength is differnt from the reading wavelength, it is advantageous to adjust the absorptivity of the dielectric layer and the reflectivity of the reflecting layer so that a minimum amount of the writing beam passes back through the dielectric layer and out through the substrate. Alternatively, if the medium is to be used in a DRAW system in which the writing and reading are both done by the same wavelength of light, a compromise must be made in writing efficiency to allow for sufficient playback reflectivity. In such a case, the dielectric layer must be relatively transmissive to the light and the reflectivity of the reflective layer becomes especially critical. In such cases, the reflective layer must be extremely reflective both to maximize the playback reflectivity and to minimize the heating of the reflective layer during writing since overheating of the reflective layer could cause damage to the reflective layer or separation of the reflective layer from the dielectric layer.

FIG. 6 is a temperature plot similar to FIGS. 5A–5C, but represents a dielectric layer having a thickness approximately three-fourths of the wavelength of the writing beam of light in the layer. Making the dielectric layer approximately equal in thickness to an odd integer multiple of a quarter wavelength of the writing beam in the medium has certain advantages in increasing the writing efficiency under certain conditions. Since it is impossible to exactly match the index of refraction of the dielectric layer with the index of refraction of the substrate, there will always be some reflection of light at this interface. Accordingly, when the thickness of the dielectric layer is adjusted to equal an odd multiple of a quarter wavelength of the writing beam, an anti-reflection phaser relationship is established which more efficiently couples the incoming beam to the dielectric layer by decreasing the amount of light allowed to escape from the dielectric layer back into the substrate.

Naturally, while this coupling is advantageous in increasing writing efficiency, it will decrease reading reflectivity if the same wavelength of light is used for writing and for reading.

The line 220 is a temperature plot with a medium value of absorptivity of the dielectric layer for the writing beam of light. The line 222 represents the temperature plot for a more highly absorptive dielectric material, and the line 224 represents the temperature plot for a less highly absorptive dielectric material. It will be noted that the change in the absorptivity of the dielectric material has a similar effect on the temperature distribution within the layer in this thicker embodiment to that in the thinner embodiment shown in FIGS. 5A, 5B and 5C.

It should be noted that the temperature plots of FIGS. 5A–5C and 6 represent the temperatures present approximately 10 nanoseconds after the end of an approximately 0.5 nanoseconds writing beam pulse. After the writing beam is turned off, the slight thermal conductivity of the dielectric material will cause the temperature variations through the depth of the medium to average out somewhat over the next few nanoseconds.

Accordingly, even if a small portion of the layer is not heated above the threshold temperature of the material, conductive transfer of heat will very shortly raise that temperature. This conduction can be accounted for and figured upon when determining the optimum peak intensity of the writing beam relative to the threshold energy level of the dielectric material.

While the above-described optical recording system and method is applicable for use with mediums in many conceivable shapes and sizes, it is particularly applicable for recording on discs which are preferably of a size and configuration which conform with the standards for optically read videodiscs or the standards for digital audio discs. The standards for videodiscs were published by the International Electrotechnical Committee in 1982 and need not be reproduced herein. Similarly, the standards for digital audio discs were published by in.

These standards place many constraints on the design of a DRAW disc. Since the standards recite relatively narrow tolerances for the size, weight, and index of refraction of the discs, the choices of substrate material are narrowed to a few plastics. Of these, polymethylmethacrylate (PMMA) is a preferred choice due to its optical characteristics.

At the same time, the disc must have a relatively high reflectivity (75%-85% for a videodisc). This requires the use of a highly reflective overcoat material such as vapor deposited aluminum in excess of 200 Å. Such an overcoat is approximately 85% reflective of the reading beam. The losses in the reflective layer and the reflectivity specification require that the light-responsive layer be extremely transmissive to the red light. Since it is also desirable that the light-responsive layer be very absorptive of a separate writing wavelength, significant restrictions are placed on the material used in the light responsive layer. In order to allow the greatest possible separation between the wavelengths of the red reading beam and the writing beam, and in order to provide sufficient resolution of the writing beam to write information at the frequencies required by the disc specifications without requiring prohibitively expensive optics, a blue or blue-green writing beam is preferred. Such a beam can conveniently be provided by an argon ion laser, although other blue or blue-green lasers are also suitable, as are ultraviolet lasers.

In order to avoid internal reflection losses, the index of refraction of the light responsive layer must be relatively close to the index of refraction of the substrate. The index of refraction of injection molded PMMA is approximately 1.5. Nitrocellulose has approximately the same index of refraction and is therefore suitable for use with PMMA substrates. Nitrocellulose is also essentially transparent to red light. However, nitrocellulose is also essentially transparent to blue light and therefore requires the addition of a blue-light-absorbing and red-light-transmitting dye. By comparing the relative absorption of various dyes at the writing and reading wavelengths, an appropriate dye can be selected.

The selection process is greatly complicated, however, by the requirement of compatibility between the substrate and all components of the light responsive layer, including any solvents or vehicles used when applying the light-responsive layer to the substrate.

In order to achieve adequate control of the thickness of the light-responsive layer, it is preferrable to spin coat the material onto the substrate. The nature of spin coating requires the light-responsive material to be mixed with a solvent to an extremely uniform and well defined viscosity. The solvent must also have a vapor pressure which causes it to evaporate at a rate within a relatively narrow range. An evaporation rate outside of this range will result in surface irregularities drastically decreasing the signal-to-noise ratio of the medium.

Most of the common solvents which efficiently dissolve nitrocellulose also dissolve PMMA. Any attack of the PMMA substrate by the solvent will produce corresponding irregularities in the light-responsive layer. Accordingly, it is necessary to carefully choose and control the solvent to prevent damage to the substrate, while at the same time allowing proper spin coating of the light-responsive layer. Since the preferred light-responsive layer also includes a dye, the dye must be compatible with the PMMA substrate, the nitrocellulose, and the solvent.

It has been found that ethylene glycol n-butyl ether is a relatively efficient solvent for nitrocellulose which has an appropriate vapor pressure for spin coating. However, ethylene glycol n-butyl ether mildly attacks PMMA. It has been found that the addition of a minority quantity of n-butyl alcohol to the ethylene glycol n-butyl ether completely inhibits the attack on the PMMA without adversely affecting the vapor pressure or volatility of the solvent and without decreasing the solubility of nitrocellulose in the solvent.

The alcohol also has been found to minimize or eliminate the "edge effect" or excessing thinning of the spin-coated layer near the center of the disc where the solution is applied.

Previous dyes used to make nitrocellulose light-absorbing for use in recording have employed "oil" dyes such as oil orange. However, such dyes are insoluble in ether and are therefore incompatible with the above-described system. Most water soluble dyes (commonly referred to as vat dyes) are soluble in ether and alcohol and are therefore compatible with the preferred solvent. Several vat dyes are available with appropriate absorption characteristics. A presently preferred dye for this purpose is known as "Atacryl Red 4G" available from Atlantic Chemical Co. A similar dye is "Astrazon Brilliant Red 4G 200" available from Mobay Chemicals.

When selecting dyes, it is important to consider the solubility characteristics of the dye in the nitrocellulose. If the dye is not highly soluble in the nitrocellulose, it will tend to crystalize as the solvent evaporates. This will result in a grainy structure with a very low signal-to-noise ratio and a very low frequency response.

The dye should also be selected based on its absolute absorption of the writing beam to assure that sufficient absorption will be provided by an amount of dye which can be reliably and efficiently mixed with the nitrocellulose and which will not cause an unacceptably high absorption of the reading beam.

The presently preferred solution for producing DRAW discs for use with optical videodisc players is produced by mixing a solution of one part n-butyl alcohol with one to nine parts of ethylene glycol n-butyl ether. Three parts of n-butyl ether yielding the preferred composition.

A nitrocellulose solution is then mixed with the solvent. The presently preferred nitrocellulose solution is a six percent solids content solution containing "RS ½" grade nitrocellulose available from Hercules Incorporated of Wilmington, Del. The desired quantity of dye is then added to the solution. The relative ratio between the dye and the nitrocellulose is adjusted to provide the desired absorption, and the relative amount of the solvent mixture is adjusted to provide the desired film thickness. The mixture is heated and allowed to sit overnight in order to stabilize in viscosity.

After the solution has stabilized, a previously injection molded and cleaned PMMA substrate disc is mounted on a variable seed turntable. The speed of the turntable and the viscosity of the solution are selected to produce a desired film thickness, in accordance with conventional spin coating practice.

A solution having a total solids content (dye and nitrocellulose) of 7.5–8.0% by weight and the remainder ethylene glycol n-butyl ether produces a coating approximately 2300–2500 Å thick when spin coated at 900–1000 rpm. The addition of n-butyl alcohol has only a minor effect on the thickness, requiring minor adjustment of the solids content of the solution if it is added in minority quantities, 6.0% to 7.5% solids being an appropriate range for a solution containing 25% n-butyl alcohol.

Depending upon the grade of nitrocellulose used and the amount of alcohol, a solution having between 5% and 10% solids may be required.

The solvent in the above-mentioned solution will evaporate in a matter of minutes on the spin coater, producing a light-responsive layer having a thickness uniformity of approximately ±50 Å.

This coated substrate is then placed in a vapor deposition chamber and coated with the reflective overcoating. As mentioned above, the preferred overcoating material is vapor deposited aluminum in excess of 200 Å in thickness. If desired, the aluminum can be deposited to a much greater thickness if deformation of the aluminum layer is not necessary.

If desired, two such three-layered discs can be glued back to back to form a composite two-sided DRAW disc. The two half-discs can be glued together using any conventional bonding agents which are compatible with the aluminum overcoats. Alternatively, the aluminum overcoats can first be protected with an intermediate coating to prevent a reaction between the aluminum and an incompatible bonding agent.

However, it is preferable to apply the bonding agent only at the inner and outer peripheries of the discs, so that the bonding agent will not interfere with the writing of information or result in irregular writing due to uneven heat-sinking of the reflective layer.

The thus completed two sided DRAW disc can be stored, handled, or shipped in the same manner as a conventional injection molded videodisc or digital audio disc without any ill effects.

In the specific embodiment of a DRAW disc which is playable on a standard video disc player or a DRAW disc which is playable on a standard digital audio disc player, the above-discussed dielectric material formed of an explosive material such as nitrocellulose and a blue-light-absorbing, red-light-transmitting dye is the presently preferred embodiment because this material reacts upon activation by the writing beam to form a clean void of closely controlled size and shape. As discussed above, if the absorptivity of the layer is properly chosen, and the peak intensity of the writing beam is properly adjusted, a relatively even temperature distribution can be established within the layer resulting in the uniform explosion of the entire thickness of the nitrocellulose-dye layer. The products of this explosion are primarily non-condensing gases which permeate through the substrate. If the reflective layer is much thicker than approximately 200 Å, it will not be distorted by the explosion. This means that the thickness of the void resulting between the reflective layer and the substrate can be very closely controlled by controlling the thickness of the nitrocellulose-dye layer deposited upon the substrate when forming the disc.

Since the reading process for such a medium is based on phase cancellation of the reflected light which travelled twice through the void by the light which travelled twice through the surrounding nitrocellulose-dye layer, the thickness of the layer must be selected to result in approximately an odd integer multiple of one quarter wavelength path length difference relative to the void for each passage of the reading beam of light through the layer. Due to the relatively thin layers of the material, it is usually only practical to cause a one quarter wavelength path length difference for each passage of the light through the layer. As a first approximation, this path length difference will be obtained when the difference in index of refraction between the altered area and the unaltered area multiplied by the thickness of the layer equals one quarter of the wavelength of the reading beam of light.

Since the altered area in a nitrocellulose-dye layer is a void, the index of refraction of such an altered area is approximately equal to 1.0.

The index of refraction of nitrocellulose is approximately 1.51. The index of refraction of Atacryl RED 4G dye is approximately 2.0. The preferred mixture of these components has a net index of refraction of approximately 1.6, giving an index of refraction difference of approximately 0.6 relative to the void.

For use with a reading beam of light having a wavelength of 6328 Å, the preferred layer thickness would then be approximately 2600 Å.

The above approximation ignores the internal reflections of the reading beam which occur due to the index of refraction difference between the void and the substrate. These reflections cause an increase in the effective path length difference. As a result of these reflections, nearly perfect phase cancellation occurs over a relatively broad range of thicknesses extending from approximately 2300 Å to approximately 2500 Å, and acceptable cancellation occurs over the range from 2000 Å to 2700 Å.

This thickness range also corresponds to approximately three quarters of the wavelength in the dielectric material of the components of light from an argon ion laser, which have free space wavelengths from about 4800 Å to about 5200 Å, the major component being at 4880 Å. Accordingly, this range of thicknesses also corresponds to an approximate optimum for the writing efficiency when using an argon ion laser, and 2400 Å is a presently preferred optimum.

Naturally, if the net index of refraction of the layer is altered due to the use of a different dye or a different light responsive material, the optimum thickness range would also be altered.

Similarly, if a material used for the light responsive layer was altered by the application of the writing beam to form an area of increased density, or an area having an index of refraction other than one, the optimum thickness of the layer could be adjusted to produce an optimum playback phase cancellation condition.

As was discussed with respect to FIG. 6, for a given thickness of light absorbing dielectric material, there is an optimum absorption co-efficient resulting in the best uniformity of temperature across the thickness of the dielectric layer. This absorption co-efficient can be derived by considering that the temperature at any point within the layer is approximately proportional to the energy absorbed at that point within the layer. Furthermore, the absorbed energy is a function of the absorption co-efficient and the total amount of energy present at that point from both the incoming wave and the reflected standing wave.

Optimum recording efficiency for a 2300 Å to 2500 Å thick layer has been found to occur when the layer has an absorption co-efficient of between $2 \times 10^{-4}/\text{Å}$ to $6 \times 10^{-4}/\text{Å}$, where the absorption co-efficient is equal to $-1/\text{thickness}$ times the natural log of the transmissivity.

With the above-mentioned range of thicknesses, this range of absorption results in the absorption of between 22% and 63% of the light traversing the layer with 38% being absorbed under optimum conditions.

Such an absorbtion co-efficient can be achieved by mixing approximately six parts by weight of RS one half nitrocellulose with one part Atacryl RED 4G dye.

A 2400 Å thick layer of this material when used in the recording medium of the present invention including a reflective layer formed of 200 Å of aluminum, will result in approximately 90% absorbtion of a writing beam of light from an argon ion laser. Recordings in a standard video disc format can be made on such a medium using a laser power at the disc of less than 10 milliwatts.

While the invention has been particularly shown and described with reference to a preferred embodiment and alterations thereto, it should be understood by those skilled in the art that various changes in form and detail may be made therein without departing from the spirit and scope of the invention.

We claim:

1. A DRAW disc compatible with the IEC standard for optical videodiscs, comprising:

a transparent substrate;

a first layer of delectric material in the range of 2300 Å to 2500 Å in thickness on one surface of said substrate, said material having an absorption coefficient for light of a wavelength of 4880 Å of between $2 \times 10^{-4}/\text{Å}$ and $6 \times 10^{-4}/\text{Å}$, said material having a threshold energy for light of a wavelength of 4880 Å above which it decomposes into primarily gasseous products; and an essentially flat reflective layer of electrically conductive material in excess of 200 Å in thickness on the opposite side of said first layer from said substrate, said disc being between 75% and 85% reflective of light having a wavelength of 6328 Å.

* * * * *